May 16, 1933. W. R. UGGLA 1,909,435

GEARED ELECTRIC DRIVING UNIT

Filed Jan. 15, 1929

W. R. Uggla
INVENTOR

By Marks & Clerk
Attys.

Patented May 16, 1933

1,909,435

UNITED STATES PATENT OFFICE

WILHELM ROBERT UGGLA, OF MORBY, STOCKSUND, SWEDEN, ASSIGNOR TO LUTH & ROSÉNS ELEKTRISKA AKTIEBOLAG, OF STOCKHOLM, SWEDEN, A CORPORATION OF SWEDEN

GEARED ELECTRIC DRIVING UNIT

Application filed January 15, 1929, Serial No. 332,669, and in Sweden March 1, 1928.

The present invention relates to electric driving units and has particular reference to geared electric units adapted to be used for driving textile looms and the like.

Looms and like machines are ordinarily mounted with a considerable degree of flexibility and the driving shafts thereof are moreover usually not only flexible to a certain degree, but also mounted in relatively loose bearings, so that considerable play is permitted in such shafts. Because of this condition, belt drives are ordinarily employed for such machinery in order to secure the necessary flexibility in the driving connection. Such drives, however, are unsatisfactory and in many respects dangerous, and the present invention has for one of its principal objects the provision of a geared electric driving unit adapted to replace the ordinary belt drive. A further object of the invention is to provide a form of geared electric driving unit which may be applied to looms or the like in cases where the shafts of adjacent looms are arranged in axial alignment with the driving ends of the shafts in close proximity to each other.

The more specific nature of the invention together with the more detailed objects thereof may be understood from a consideration of the following description of a preferred embodiment as illustrated in the accompanying drawing.

Figure 1:
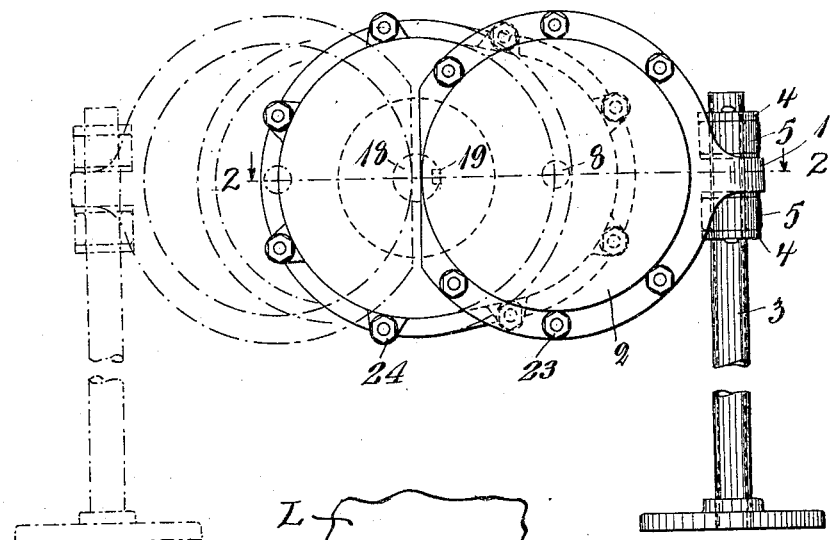
Figure 2:
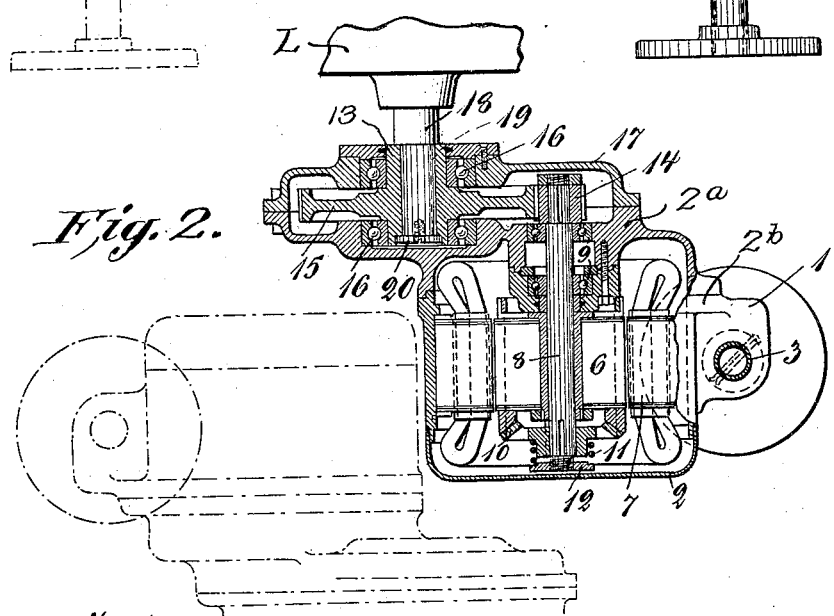
Figure 3:
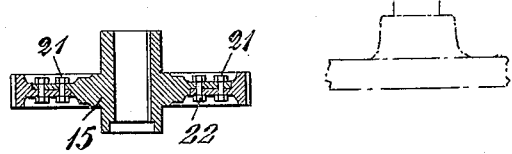

A driving unit embodying the invention is illustrated in a side view in Fig. 1 of the accompanying drawing. A second combined gearing and motor is shown by dotted lines and located at the opposite side of a second row of looms. Fig. 2 is a section of the combined toothed gearing and motor on the line 2—2 of Fig. 1 and shows by means of dotted lines the position of the said second combined toothed gearing and motor. Fig. 3 shows in a transverse section a toothed wheel provided with interchangeable rim.

The driving unit is by means of a lug 1 provided on the casing 2 loosely mounted on an upright 3 fixed on the floor. Between the lug 1 and rings 4 fixed on the upright, rings 5 of India rubber or the like are provided, so that the driving unit is carried in a yielding manner. 6 is the rotor and 7 the stator of the motor. The said rotor is rotatably mounted on a shaft 8 which is journaled in ball-bearings 9 at one end. On the other end of the shaft 8 a friction disc 10 is slidably mounted which by means of groove and key is connected to the shaft 8 and is forced by a spring 11 against a friction surface provided on the rotor. The tension of the spring is controlled by means of a nut 12 in screw-threaded engagement with the shaft 8. The driving power is transmitted from the shaft 8 to a sleeve like power output shaft 13 by means of gears 14 and 15. The shaft 13, which in the form of apparatus shown in the drawing constitutes the hub of the gear 15, is journaled in ball bearings 16 provided in the casing 2, which is divided into two parts 2a and 2b secured together by bolts 23, and in a cover 17 of the casing secured to the part 2a by bolts 24. The driving shaft of the loom L is designated by 18 and has rigidly secured thereto the shaft 13, formed by the hub of the gear 15. This hub is secured against rotation with respect to shaft 18 by means of key 19, and against axial displacement with respect to the shaft by the disc 20 screwed into the end fixed to the end of shaft 18.

Owing to the fact that the shaft 8 transmits power in torsion the power is transmitted from the motor to the loom in a resilient or yielding manner. If it is necessary to bring the loom and the motor to a sudden stop as for example due to a jammed shuttle, this may be effected without the parts being subjected to any great strain because of the friction clutch 10 and the torsional resilience of the shaft 8.

The casing of the driving unit is generally L-shaped in section, as will be seen from Fig. 2, the portion of the casing containing the motor bearing entirely to one side of the axis of the loom shaft. By choosing suitable sizes for the gears 14 and 15 the casing of the driving unit may be so arranged that the casing for the motor proper is not in the way of the casing of the motor driving the adjacent loom, as will be evident from Fig. 2, even though the power output shafts of both the driving units are in coaxial alignment with the axially aligned driving shafts of the looms.

If woven fabrics of different thicknesses for instance should be manufactured in the same loom, the latter must be run at different rates of speed, that is, more slowly for thicker fabrics than for thinner fabrics. This changing of the velocity may be effected by altering the ratio of gearing of the gears 14 and 15. In order that the said changing may be effected without the ball-bearings 16 being dismounted, the tooth-carrying rim of the gear 15 is made removable preferably in such manner that the web of the gear 15 is divided from the toothed rim through a distance toward the hub along a Z-shaped line, as shown in Fig. 3, so that the rim may be fixed by means of screw bolts 21 and nuts 22 to the part of the web united with the hub. After the driving unit has been removed from its place the rim may easily be replaced by another rim, which together with a corresponding pinion provides the desired ratio of gearing and runs the loom at the desired rate.

It will be evident that changes and modifications may be made in the structure illustrated herein by way of example without departing from the scope of the present invention.

I claim:

1. Apparatus of the character described comprising a driving shaft for looms and the like, a geared electric driving unit for said shaft comprising a driven gear secured to said shaft in rigid driving relation therewith and detachable therefrom, a motor having a driving gear meshing with said driven gear, a rigid casing for said gears and said motor and a bearing for rotatably mounting said driven gear in said casing and for transmitting support to the casing from the driven gear, whereby to provide a first support for said unit, and yieldable means providing a second and yieldable support for said unit.

2. Apparatus of the character described comprising a driving shaft for looms and the like, a geared electric driving unit for said shaft comprising a driven gear secured to said shaft in rigid driving relation therewith and detachable therefrom, a motor having a driving gear meshing with said driven gear, a rigid casing for said gears and said motor and a bearing for rotatably mounting said driven gear in said casing and for transmitting support from the driven gear to the casing, whereby to provide a first support for said unit, and means including a yieldable connection for providing a second and yieldable support for said unit laterally of said first support.

3. Apparatus of the character described comprising a driving shaft for looms and the like, a geared electric driving unit for said shaft comprising a driven gear secured to said shaft in rigid driving relation therewith and detachable therefrom, a motor having a driving gear meshing with said driven gear, a rigid casing for said gears and said motor and a bearing for rotatably mounting said driven gear in said casing and transmitting support from the driven gear to the casing, whereby to provide a first support for said unit, a supporting member situated to one side of the axis of said shaft and yieldable means providing a supporting connection between said supporting member and said casing, said yieldable means permitting relative movement between said casing and said supporting member.

4. Apparatus of the character described comprising a driving shaft for looms and the like, a supporting member situated to one side of the axis of said shaft, a geared electric driving unit for said shaft, said unit comprising power transmitting members, a rigid casing for said power transmitting members and bearings for rotatably mounting said power transmitting members in said casing, and yieldable means for connecting said supporting member to the casing to provide one support for said unit, one of said power transmitting members being secured to said driving shaft in rigid driving relation therewith and detachable therefrom to provide a second support for said unit.

5. Apparatus of the character described comprising a driving shaft for looms and the like having an overhung end portion, a supporting member situated to one side of the axis of said shaft, a geared electric driving unit for said shaft, said unit comprising a motor, power transmitting gearing including an annular power output shaft adapted to be driven by said motor, a rigid casing for said motor and gearing and a bearing for rotatably mounting said power output shaft in said casing and transmitting support to the casing from the shaft, said power output shaft being secured to the overhung end of said driving shaft in rigid driving relation therewith and detachable therefrom to provide one support for said unit and a yieldable connection between said casing and said supporting member for providing a second support for the unit.

6. Apparatus of the character described comprising a driving shaft for looms and the like having an overhung end, a supporting member situated to one side of the axis of said shaft, a geared electric driving unit for said shaft comprising a rigid casing, a power transmitting gear member comprising a hub portion providing an annular power output shaft, a bearing for rotatably mounting said hub portion in said casing and transmitting support from said hub portion to said casing, and a motor mounted in said casing and having a driving pinion meshing with said power transmitting gear, said power output shaft being fixed to the overhung end of said driving shaft in rigid driving relation therewith and detachable therefrom whereby to provide a first support for said unit, and a yieldable connection between said casing and said supporting member for providing a second support for said unit.

7. Apparatus of the character described comprising a driving shaft for looms and the like having an overhung end, a supporting member situated to one side of the axis of said shaft, a rigid geared electric driving unit comprising a casing, a motor in said casing and a power transmitting member geared to said motor, said power transmitting member having an extension projecting through said casing and a bearing for rotatably mounting said power transmitting member in said casing and transmitting support from the power transmitting member to the casing, means for rigidly and detachably securing said power transmitting member to the overhung end of said driving shaft and yieldable means providing a supporting connection between said casing and said supporting member.

In testimony whereof I have hereunto affixed my signature.

WILHELM ROBERT UGGLA.